United States Patent [19]

Eto

[11] 3,833,902

[45] Sept. 3, 1974

[54] INTEGRATING A-D CONVERSION SYSTEM

[76] Inventor: Tetutaro Eto, No. 841, 2-chome, Soshigaya, Tokyo, Japan

[22] Filed: Oct. 5, 1972

[21] Appl. No.: 295,186

Related U.S. Application Data

[63] Continuation of Ser. No. 84,365, Oct. 27, 1970, abandoned.

[30] Foreign Application Priority Data

Oct. 30, 1969 Japan ............................... 44-86639

[52] U.S. Cl. .......................................... 340/347 NT

[51] Int. Cl. .......................................... H03k 13/02

[58] Field of Search... 340/347 NT, 347 AD, 347 C; 324/99 D

[56] References Cited

UNITED STATES PATENTS

| | | | |
|---|---|---|---|
| 3,251,052 | 5/1966 | Hoffman et al. | 340/347 C |
| 3,449,741 | 6/1969 | Egerton et al. | 340/347 C |

*Primary Examiner*—Raulfe B. Zache
*Assistant Examiner*—Joseph M. Thesz, Jr.
*Attorney, Agent, or Firm*—Marshall & Yeasting

[57] ABSTRACT

An integrating A-D conversion system which is adapted to provide an analog input voltage in the form of a binary number and comprises the steps of (1) positively integrating a positive analog input voltage for a period of time 2T, (2) subtracting from the resulting voltage in (1) a negative voltage produced by integrating a negative reference voltage $-V_r$ for a period of time T, (3) adding the resulting voltage in (2) with a negative (or positive) voltage produced by integrating the voltage $-V_r$ (or $+V_r$) for a period of time T/2 according as the resulting voltage in (2) is positive (or negative), (4) adding the resulting voltage in (3) with a negative (or positive) voltage produced by integrating the voltage $-V_r$ (or $+V_r$) for a period of time T/4 according as the resulting voltage in (3) is positive (or negative), (5) adding the resulting voltage in (4) with a negative (or positive) voltage produced by integrating the voltage $-V_r$ (or $+V_r$) for a period of time T/8 according as the resulting voltage in (4) is positive (or negative), (6) adding the resulting voltage in (5) with a negative (or positive) voltage produced by integrating the voltage $-V_r$ (or $+V_r$) for a period of time T/16 according as the resulting voltage in (5) is positive (or negative), . . . . and so on, and obtaining a digital output, representing a binary number whose digits are determined by whether the corresponding resulting voltages in (2), (3), . . . . are positive or negative respectively.

3 Claims, 7 Drawing Figures

PATENTED SEP 3 1974 3,833,902

SHEET 3 OF 7

INVENTOR.

BY

INTEGRATING A-D CONVERSION SYSTEM

This is a continuation of application Ser. No. 84,365, filed Oct. 27, 1970, and now abandoned.

BACKGROUND OF THE INVENTION

1. Field of the Invention

This invention relates to an A-D conversion system, and more particularly to an integrating A-D conversion system which is adapted to provide an analog input voltage in the form of a digital output having *ns* digits of the binary system.

SUMMARY OF THE INVENTION

This invention is to provide a novel integrating A-D conversion method which is adapted to convert an analog voltage into a digital output in the form of a a binary number having *n* digits. According to this invention, digital outputs are easily obtained in the form of a binary number through the use of a simple structure employing one integrating means.

DESCRIPTION OF THE PREFERRED EMBODIMENTS

Figure 1:
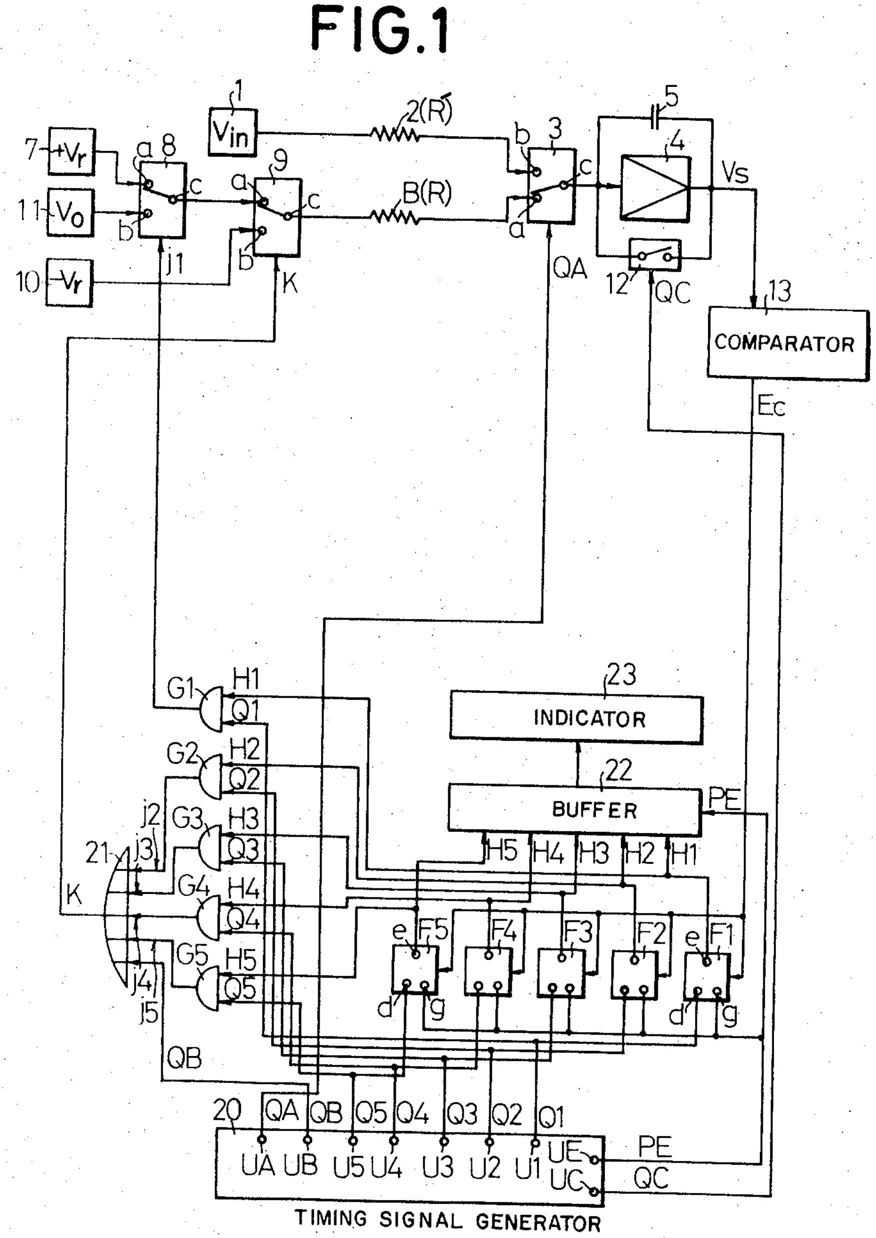
FIG. 1 is a block diagram showing one example of an integrating A-D conversion system of the present invention.

A description will be given first of the example of this invention depicted in FIG. 1. In the figure reference numeral 1 indicates an analog voltage source, from which a positive analog voltage $+V_{in}$ is applied to the input side of an amplifier 4 through a resistor 2 having a resistance value R′ and a fixed contact *b* and a movable contact *c* of a switching circuit 3. A capacitor 5 having a capacitance C is connected between the input and output sides of the amplifier 4 and at the output side of the amplifier 4 there is derived an integrated output produced by positively integrating the analog voltage $+V_{in}$ with the resistor 2 and the capacitor 5 being used as integration constants.

Reference numeral 7 designates a reference voltage source, from which a positive reference voltage $+V_r$ is supplied to the input side of the amplifier 4 through a fixed contact *a* and a movable contact *c* of a switching circuit 8, a fixed contact *a* and a movable contact *c* of a switching circuit 9, a resistor B having a resistance value R and a fixed contact *a* and the movable contact *c* of the switching circuit 3, thereby deriving at the output side of amplifier 4 an integrated output produced by positively integrating the reference voltage $+V_r$ with the resistor B and the capacitor 5 being used as integration contacts.

Reference numeral 10 identifies a negative reference voltage source, from which a negative reference voltage $-V_r$ is fed to the input side of the amplifier 4 through a fixed contact *b* and the movable contact *c* of the switching circuit 9, the resistor B and the contacts *a* and *c* of the switching circuit 3, thereby deriving at the output side of the amplifier 4 an integrated output which is produced by negatively integrating the reference voltage $-V_r$ with the resistor B and the capacitor 5 being used as integration constants.

Reference numeral 11 indicates a zero reference power source, from which a zero voltage $V_o$ is supplied to the input side of the amplifier 4 through a fixed contact *b* and the movable contact *c* of the switching circuit 8, the contacts *a* and *c* of the switching circuit 9, the resistor B and the contacts *a* and *c* of the switching circuit 3. In this case, however, the voltage $V_o$ is zero, so that at the output side of the amplifier 4, neither positive nor negative integration is achieved and the integrated output is not changed.

Reference numeral 12 represents a switch which is connected in parallel to the capacitor 5 for reducing the integrated output to zero.

Reference numeral 13 designates a comparator circuit which is connected to the output side of the amplifier 4 and compares an integrated output $V_s$ produced therefrom with the zero reference voltage whether the former is positive (including zero) or negative relative to the latter. The comparator circuit 13 is adapted to produce a compared output $E_c$ which is indicated by "1" or "0" according as the integrated output voltage $V_s$ is positive or negative.

Figure 2:
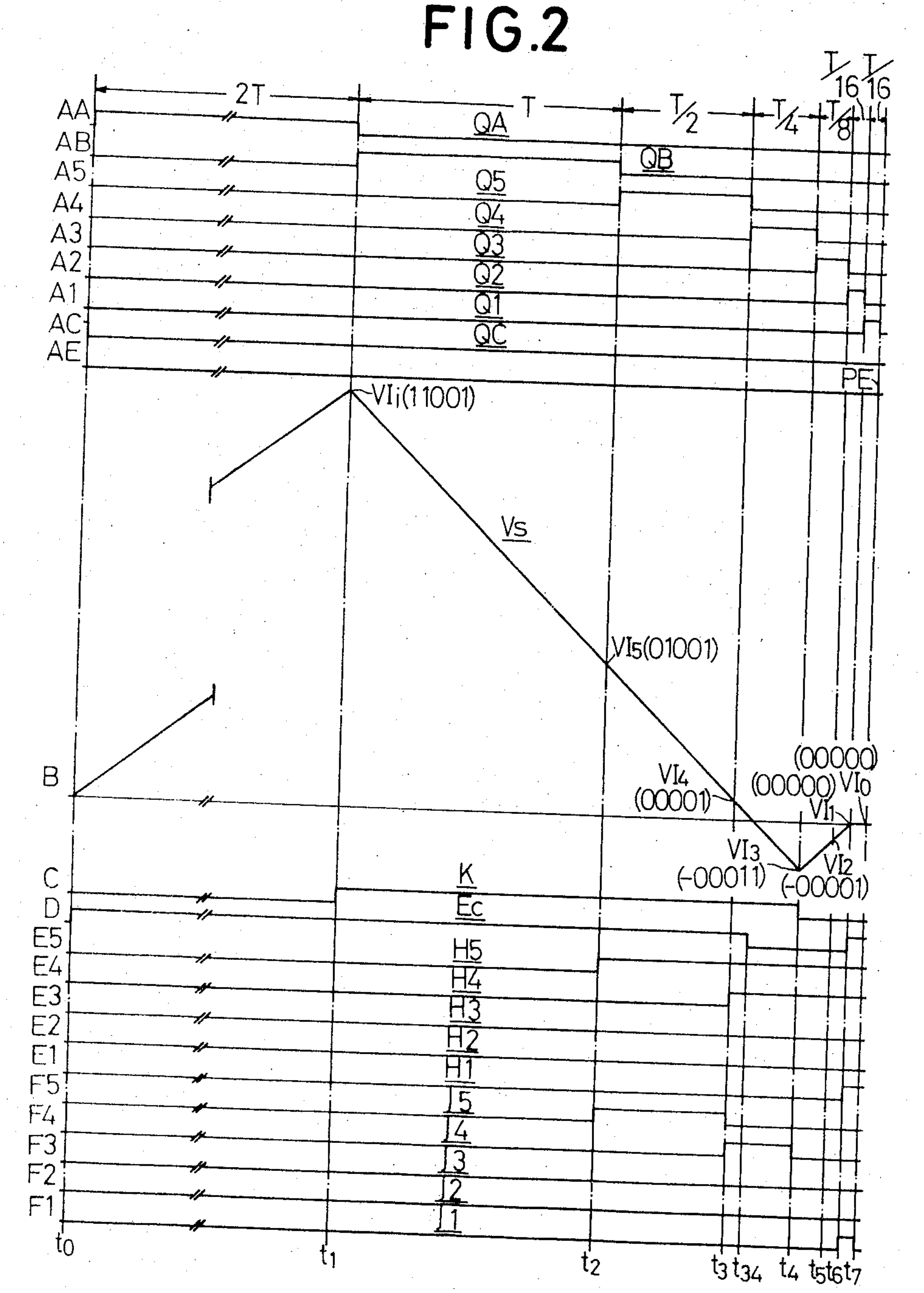
FIGS. 2 and 3 are waveforms for explaining the system exemplified in FIG. 1.

Reference numeral 20 identifies a timing signal generator circuit. For convenience of explanation, times in sequential order are indicated by $t_O$, $t_l$, $t_2$, $t_3$, $t_5$, $t_6$ and $t_7$ and periods of time between the times $t_0$ and $t_1$, between $t_1$ and $t_2$, between $t_2$ and $t_3$, between $t_3$ and $t_4$, between $t_4$ and $t_5$, between $t_5$ and $t_6$ and between $t_6$ and $t_7$ are respectively denoted by 2T, T, T/2, T/4, T/8, T/16 and T/16. The timing signal generator circuit 20 is designed to produce a rectangular wave QA of a level "1" such as shown in FIG. 2-AA at a terminal UA between the times $t_0$ and $t_1$, a rectangular wave QB of the level "1" such as depicted in FIG. 2-AB at a terminal UB between the times $t_1$ and $t_2$, a rectangular wave Q5 of the level "1" such as illustrated in FIG. 2-A5 at a terminal U5 between the times $t_2$ and $t_3$, . . . . a rectangular wave Q1 of the level "1" such as shown in FIG. 2-A1 at a terminal U1 between the times $t_6$ and $t_7$, a pulse PE at a terminal UE at the time $t_7$ as shown in FIG. 2-AE and a rectangular wave QC of the level "1" at a terminal UC prior to the time $t_0$ as illustrated in FIG. 2-AC.

The rectangular wave QA is fed to the switching circuit 3 to control it in such a manner that its contact *c* lies on the contact *b* while the rectangular wave QA is at the level "1" and that the contact *c* lies on the contact *a* while the rectangular wave is at the level "0." The rectangular wave QB is applied to an "OR" circuit 21 and the rectangular waves Q5, Q4, Q3, Q2 and Q1 are respectively supplied to "AND" circuits G5, G4, G3, G2 and G1. While the rectangular waves Q5, Q4, Q3, Q2 and Q1 are respectively fed to set terminals *d* of flip-flop circuits F5, F4, F3, F2 and F1. These flip-flop circuits F5, F4, F3, F2 and F1 are supplied with the compared output $E_c$ and when the compared output $E_c$ is at the level "1" the flip-flop circuits F5, F4, F3, F2 and F1 are respectively set by the leading edges of the rectangular waves Q5, Q4, Q3, Q2 and Q1, and accordingly outputs H5, H4, H3, H2 and H1 derived at output terminals *e* of the flip-flop circuits F5 to F1 are indicated by "1" respectively. When the compared output $E_c$ is at the level "0" the flip-flop circuits F5 to F4 are not set by the rectangular waves Q5 to Q1, and accordingly the outputs H5 to H1 are indicated by "0."

The flip-flop circuits F5 to F1 respectively correspond to fifth to first digits of a binary number, so that the outputs H5 to H1 represent a digital output of a binary number having five digits. This digital output is fed to a buffer circuit 22, while the buffer circuit 22 is supplied with the pulse PE obtained at the time $t_7$ and based upon the pulse PE the digital output represented by the outputs of the flip-flop circuits F5 to F1 is applied to a memory circuit 23. Further, the pulse PE is supplied to reset terminals *g* of the flip-flop circuits F5 to F1, by which if their outputs H5 to H1 are at the level "1," they are changed to the level "0."

Further, the outputs H5 to H2 are respectively applied to the aforementioned "AND" circuits G5 to G2, whose outputs J5 to J2 are fed to the "OR" circuit 21. Then, the output K of the "OR" circuit 21 is, in turn, supplied to the switching circuit 9 to control it in such a manner that its contact *c* is held on the contact *b* while the output K is at the level "1" and that the contact *c* lies on the contact *a* while the output K is at the level "0."

While, the output H1 is applied to the aforementioned circuit G1, whose output J1 is fed to the switching circuit 8 to control it so that its contact *c* stays on the contact *b* while the output J1 is at the level "1" and the contact *c* remains on the contact *a* while the output J1 is at the level "0."

The rectangular wave QC is supplied to the switch 12 to turn it on while the rectangular wave QC is at the level "1."

The foregoing has outlined the construction of one example of this invention, which will be further described together with its operation. Since the switch 12 is closed by the rectangular wave QC prior to the time $t_0$, the integrated output $V_s$ is zero. Assume that the flip-flop circuits F5 to F1 are respectively reset before the time $t_0$, and accordingly the outputs H5 to H1 are respectively at the level "0."

Under such conditions, the rectangular wave QC becomes of the level "0" at the time $t_0$ and switch 12, is opened and, further, the rectangular wave QA becomes of the level "1," so that positive integration of the analog voltage $V_{in}$ is initiated with an integrator consisting of the resistor 2, the capacitor 5 and the amplifier 4 and this integration is continued to the time $t_1$ when the rectangular wave QA be comes of the level "0."

The resistance value of the resistor 2 is R', the capacitance of the capacitor 5 is C and the period of time between the times $t_0$ and $t_1$ is 2T, so that the above integration is achieved based on the following equation.

$$\frac{1}{R'C}\int_0^{2T} V_{in}\,dt = VI_i \qquad (1)$$

Accordingly, the value of the integrated output $V_s$ at the time $t_1$ is $VI_i$ (volt) given by the equation (1). For convenience of explanation, let it be assumed that the value $VI_i$ of the equation (1) is $+V_{in}$ such as "11001" volts in binary number ("25" in decimal number). The integrated output $V_s$ increases from the zero voltage at the time $t_0$ to $VI_i$ as a value of "11001" volts in binary number ("25" in decimal number) at the time $t_1$, as shown in FIG. 2—B.

At the time $t_1$ the rectangular wave QA becomes of the level "0" and the contact *c* of the switching circuit 3 is turned down to the contact *a*. While, the rectangular wave QB becomes to the level "1" and is applied to the "OR" circuit 21, whose output K is becomes to the level "1" to bring the contact *c* of the switching circuit 9 to the contact *b*. As a result of this, negative integration of the reference voltage $-V_r$ is initiated with an integrator consisting of the resistor B, the capacitor 5 and the amplifier 4 and this integration is kept on to the time $t_2$ when the rectangular wave QB becomes to the level "0."

The resistance value of the resistor B is R, the capacitance of the capacitor 5 is C and the period of time between the times $t_1$ and $t_2$ is T, so that the above integration is accomplished based upon the following equation.

$$-\frac{1}{RC}\int_0^{T} V_r\,dt = -V_{16} \qquad (2)$$

Therefore, the value $VI_5$ of the integrated output $V_s$ at the time $t_2$ is given as follows:

$$VI_5 = VI_i - V_{16} \qquad (3)$$

For the sake of brebity, if the value of $|-V_r|$, resistance R and capacitance C in the equation (2) are so selected that $V_{16}$ is "10000" volts in binary number (16 $= 2^4$ in decimal number), the value of the integrated output $V_s$ becomes smaller than "11001" volts in binary number ("25" in decimal number) at the time $t_1$ and has a value such that $VI_5 = 11001 - 10000 = 01001$ (volts) in binary number ($VI_5 = 25 - 16 = 9$ (volts) in decimal number). At the time $t_2$ the rectangular wave QB becomes to the level "0" and the rectangular wave Q5 becomes to the level "1." While, the integrated output $V_s$ is positive between the times $t_0$ and $t_2$, so that the output $E_c$ of the comparator circuit 13 is at the level "1" as depicted in FIG. 2—D between the times $t_0$ and $t_2$. Accordingly, the flip-flop circuit F5 is set at the time $t_2$ and its output H5 is changed to the level "1" as depicted in FIG. 2—E5. As a result of this, the output J5 of the "AND" circuit G5 becomes to the level "1" as shown in FIG. 2—F5 and is applied to the "OR" circuit 21 and its output K becomes to the level "1" even after the time $t_2$, so that the contact *c* of the switching circuit 9 remains on the contact *b*. Consequently, the reference voltage $-V_r$ is similarly integrated and this integration is continued to the time $t_3$ when the output J5 is changed to the level "0," since the rectangular wave Q5 becomes to the level "0."

The integration in this case is carried out based on the following equation.

$$-\frac{1}{RC}\int_0^{\frac{T}{2}} V_r\,dt = -\frac{V_{16}}{2} = -V_8 \qquad (4)$$

Therefore, the value $VI_4$ of the integrated output $V_s$ at the time $t_3$ is given as follows:

$$VI_4 = VI_5 - V_8 \qquad (5)$$

By the way, $V_8$ is "01000" volts in binary number ($8 = 2^3$ in decimal number), so that the integrated output $V_s$ becomes smaller than "01001" volts in binary number ("9" in decimal number) at the time $t_2$ and has a value such that $VI_4 = 01001 - 01000 = 00001$ volts in binary number ($VI_4 = 9 - 8 = 1$ in decimal number) at the time $t_3$.

At the time $t_3$ the rectangular wave Q5 becomes to the level "0" and the rectangular wave Q4 becomes to the level "1" and the integrated output $V_s$ remains positive until the time $t_3$. Accordingly, the output $E_c$ of the comparator circuit 13 is at the level "1," and consequently the flip-flop circuit F4 is set at the time $t_3$ and its output H4 is changed to the level "1." As a result of this, the output J4 of the "AND" circuit G4 becomes to the level "1" as depicted in FIG. 2–F4 and the output K of the "OR" circuit 21 remains at the level "1" even after the time $t_3$ to hold the contact *c* of the switching circuit 9 on the contact *a*. Consequently, the reference voltage $-V_r$ is integrated and this integration continues until the time $t_4$ when the rectangular wave Q4 becomes to the level "0" to cause the output J4 to the level "0."

This integration is achieved based on the following equation $$-\frac{1}{RC}\int_0^{\frac{T}{4}} V_r\,dt = -\frac{V_{16}}{4} = -\frac{V_8}{2} = -V_4 \qquad (6)$$

Therefore, the value $VI_3$ of the integrated output $V_s$ at the time $t_4$ is given as follows:

$$VI_3 = VI_4 - V_4 \qquad (7)$$

By the way, since $V_4$ is "00100" volts in binary number ($4 = 2^2$ in decimal number), the integrated output $V_s$ becomes smaller than the value of "00001" volts in binary number ("1" in decimal number) at the time $t_3$ as depicted in FIG. 2—B and has a value such that $VI_3 = 00001 - 00100 = -00011$ volts in binary number ($VI_3 = 1–4 = 3$ in decimal number) at the time $t_4$.

At the time $t_4$ the level of the rectangular wave Q4 becomes to "0" and that of the rectangular wave Q3 becomes to "1" and the integrated output $V_s$ becomes negative at a time $t_{34}$ intermediate between the times $t_3$ and $t_4$. Accordingly, the level of the output $E_c$ of the comparator circuit 13 becomes "0" at the time $t_{34}$, and consequently the flip-flop circuit F3 is not set at the time $t_4$ and its output H3 is at the level "0" as shown in FIG. 2—E3. Therefore, the output J3 of the "AND" circuit G3 is also at the level "0" as depicted in FIG. 2—F3 and the level of the output K of the "OR" circuit 21 becomes "0" at the time $t_4$. As a result of this, the contact *c* of the switching circuit 9 is changed over to its contact *a* to integrate the reference voltage $+V_r$ and this integration continues until the time $t_5$ when the level of the rectangular wave Q3 becomes "0."

This integration is accomplished based on the following equation.

$$\frac{1}{RC}\int_0^{\frac{T}{8}} V_r\,dt = \frac{V_{16}}{8} = \frac{V_8}{4} = \frac{V_4}{2} = V_2 \qquad (8)$$

Therefore, the value $VI_2$ of the integrated output $V_s$ at the time $t_5$ is given as follows:

$$VI_2 = VI_3 - V_2 \qquad (9)$$

By the way, since $V_2$ is "00010" volts in binary number ($2 = 2^1$ in decimal number), the integrated output $V_s$ increases from the value of "–00011" volts in binary number ("–3" in decimal number) at the time $t_4$ as depicted in FIG. 2—B and has a value such that $VI_2 = -00011 + 00010 = -00001$ volts in binary number ($VI_2 = -3 + 2 = -1$ in decimal number at the time $t_5$.

At the time $t_5$ the rectangular wave Q3 becomes to the level "0" and the rectangular wave Q2 becomes to the level "1." However, the output $E_c$ of the comparator circuit 13 remains at the level "0," so that the flip-flop circuit F2 is not set and its output H2 is at the level "0" as shown in FIG. 2—E2. Accordingly, the output J2 of the "AND" circuit G2 is also at the level "0" as depicted in FIG. 2—F2 to hold the output K of the "OR" circuit at the level "0." As a result of this, the contact *c* of the switching circuit 9 is retained on its contact *a* and the reference voltage $+V_r$ is integrated and this integration is kept on until the time $t_6$ when the rectangular wave Q2 becomes to the level "0."

This integration is carried out based on the following equation.

$$\frac{1}{RC}\int_0^{\frac{T}{16}} V_r\,dt = \frac{V_{16}}{16} = \frac{V_8}{8} = \frac{V_4}{4} = \frac{V_2}{2} = V_1 \qquad (10)$$

Therefore, the value $VI_1$ of the integrated output $V_s$ is given as follows:

$$VI_1 = VI_2 + V_1 \qquad (11)$$

By the way, since $V_1$ is "00001" volts in binary number ($1 = 2^0$ in decimal number), the integrated output $V_s$ increases from the value of "–00001" volts ("–1" in decimal number) at the time $t_5$ and has a value such that $VI_1 = -00001 + 00001 = 00000$ volts ($VI_1 = -1 + 1 = 0$ in decimal number) at the time $t_6$.

At the time $t_6$ the level of the rectangular wave Q2 becomes to "0" and that of the rectangular wave Q1 becomes to "1." While, the integrated output $V_s$ is reduced to zero at the time $t_6$, so that the output $E_c$ becomes to the level "1" at the time $t_6$ to thereby set the flip-flop circuit F1. Consequently, the level of the output H1 becomes "1" as shown in FIG. 2—E1 and that of the output J1 of the "AND" circuit G1 also becomes "1." While, the output K of the "OR" circuit 21 remains at the level "0" after the time $t_6$. And the contact *c* of the switching circuit 8 is changed over to its contact *b* but the contact *c* of the switching circuit 9 remains on its contact *a*, so that the zero voltage $V_0$ is integrated until the time $t_7$. This integration is accomplished based on the following equation.

$$\frac{1}{RC}\int_0^{\frac{T}{16}} V_0\,dt = V_0 \qquad (12)$$

Therefore, the value $VI_0$ of the integrated output $V_s$ at the time $t_7$ is given as follows:

$$VI_0 = VI_1 + V_0 \quad (13)$$

By the way, since $V_0$ is zero volt, the value of the integrated output $V_s$ remains unchanged and has a value such that $VI_0$ = 00000 volt at the time $t_7$.

Thus, at the time $t_7$ the outputs H5, H4 and H1 are 1 and the outputs H3 and H2 are 0. These outputs are fed through the buffer circuit 22 to the memory circuit 23 based upon the pulse PE at the time $t_7$ and memorized therein. The content of this memory is "1100" in binary number, which indicates that the analog voltage $V_{in}$ is "11001" volts in binary number ("25" in decimal number).

Figure 3:
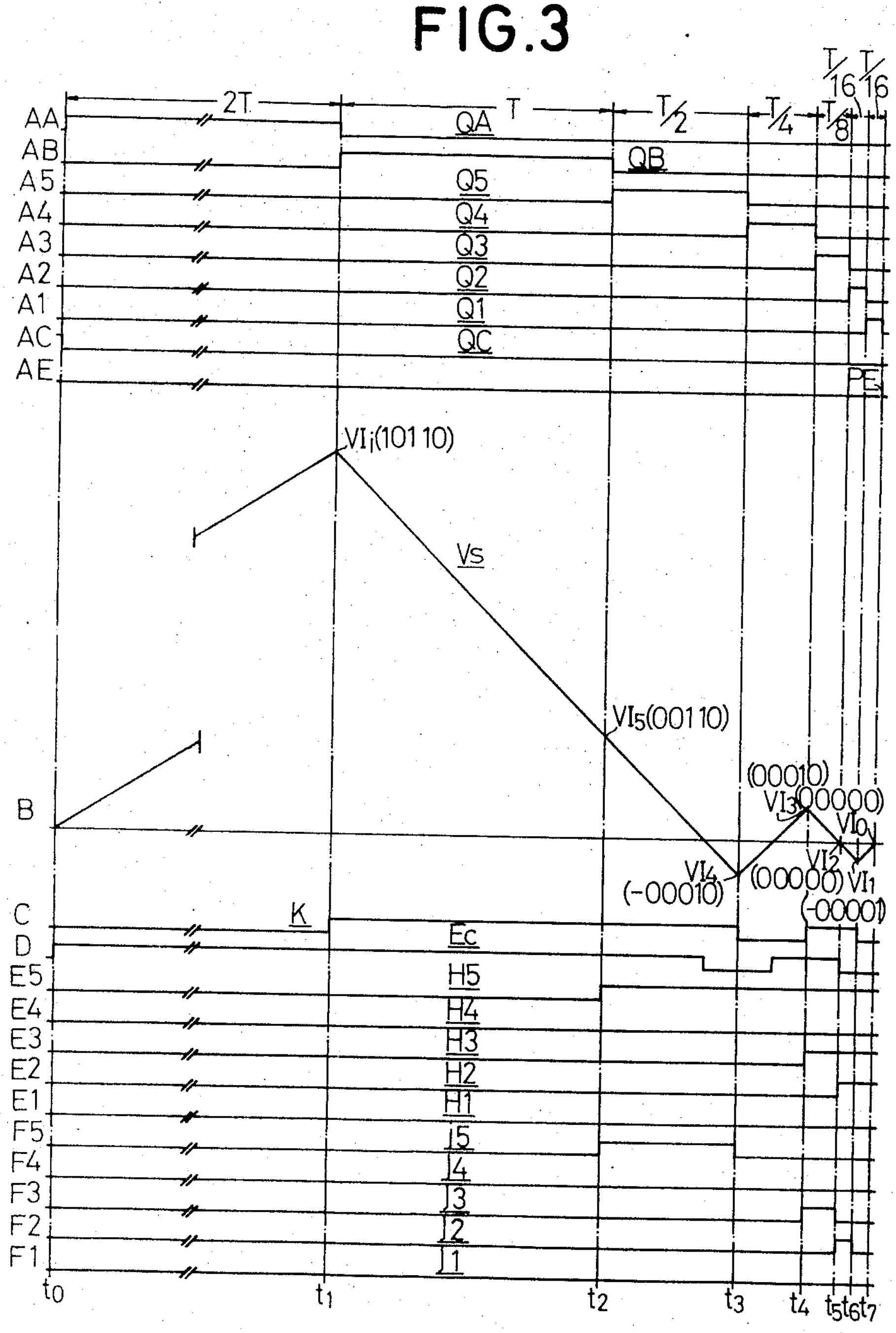

The foregoing has described the operation of the A-D converter of the construction shown in FIG. 1 in the case where the analog voltage $V_{in}$ is "11001" in binary number ("25" in decimal number). FIG. 3 shows the operation of the A-D converter of FIG. 1 in the case where the analog voltage $V_{in}$ is "10110" in binary number ("22" in decimal number). In the present example, the value $VI_i$ of the integrated output $V_s$ at the time $t_1$ is "10110" in binary number ("22" in decimal number) based upon the following equation.

$$\frac{1}{R'C}\int_0^{2T} V_{in}\,dt = VI_i \quad (14)$$

At the time $t_2$ the value $VI_5$ of the integrated output $V_s$ is such that $VI_i - V_{16}$ = 10110 − 10000 = 00110 (volts) based upon the following equation.

$$-\frac{1}{RC}\int_0^{T} V_r\,dt = -V_{16} \quad (15)$$

At the time $t_3$ the integrated output $V_s$ has such a value $VI_4$ that $VI_5 - V_8$ = 00110 − 01000 = − 00010 (volts) based upon the following equation.

$$-\frac{1}{RC}\int_0^{\frac{T}{2}} V_r\,dt = -V_8 \quad (16)$$

At the time $t_4$ the integrated output $V_s$ is of such a value $VI_3$ that $VI_4 - V_4$ = − 00010 + 00100 = 00010 (volts) based upon the following equation.

$$\frac{1}{RC}\int_0^{\frac{T}{4}} V_r\,dt = V_4 \quad (17)$$

At the time $t_5$ the value $VI_2$ of the integrated output $V_s$ is such that $VI_3 - V_2$ = 00010 − 00010 = 00000 (volt) based upon the following equation.

$$-\frac{1}{RC}\int_0^{\frac{T}{8}} V_r\,dt = -V_2 \quad (18)$$

At the time $t_6$ the value $VI_1$ of the integrated output $V_s$ is such that $VI_2 - V_1$ = 00000 − 00001 = − 00001 (volt) based upon the following equation.

$$-\frac{1}{RC}\int_0^{\frac{T}{16}} V_r\,dt = -V_1 \quad (19)$$

At the time $t_7$ the value $VI_0$ of the integrated output $V_s$ is such that $VI_1 + V_1$ = − 00001 + 00001 = 00000 (volt) based upon the following equation.

$$\frac{1}{RC}\int_0^{\frac{T}{16}} V_r\,dt = V_1 \quad (20)$$

Thus, at the time $t_7$ the outputs H5 to H1 are respectively "1," "0," "1," "1" and "0" and they are applied through the buffer circuit 22 to the memory circuit 23 based upon the pulse PE at the time $t_7$ and memorized in the memory circuit. Accordingly, it is known that the analog voltage $V_{in}$ is "10110" volts in binary number ("22" in decimal number).

The foregoing description has been given in connection with the cases where the analog voltage $V_{in}$ is "11001" and "10110" in binary number and so long as the analog voltage is less than "10000" volts in binary number ("32" in decimal number), the analog voltage $V_{in}$ can be obtained in the form of a digital output of five digits in binary number. Further, the foregoing description has been given of the case where the analog voltage $V_i$ is positive but it will be seen that when the analog voltage is negative, too, exactly the same results can be obtained, if the output $E_c$ of the comparator circuit 13 can be obtained in the opposite polarity to that in the foregoing.

Figure 4:
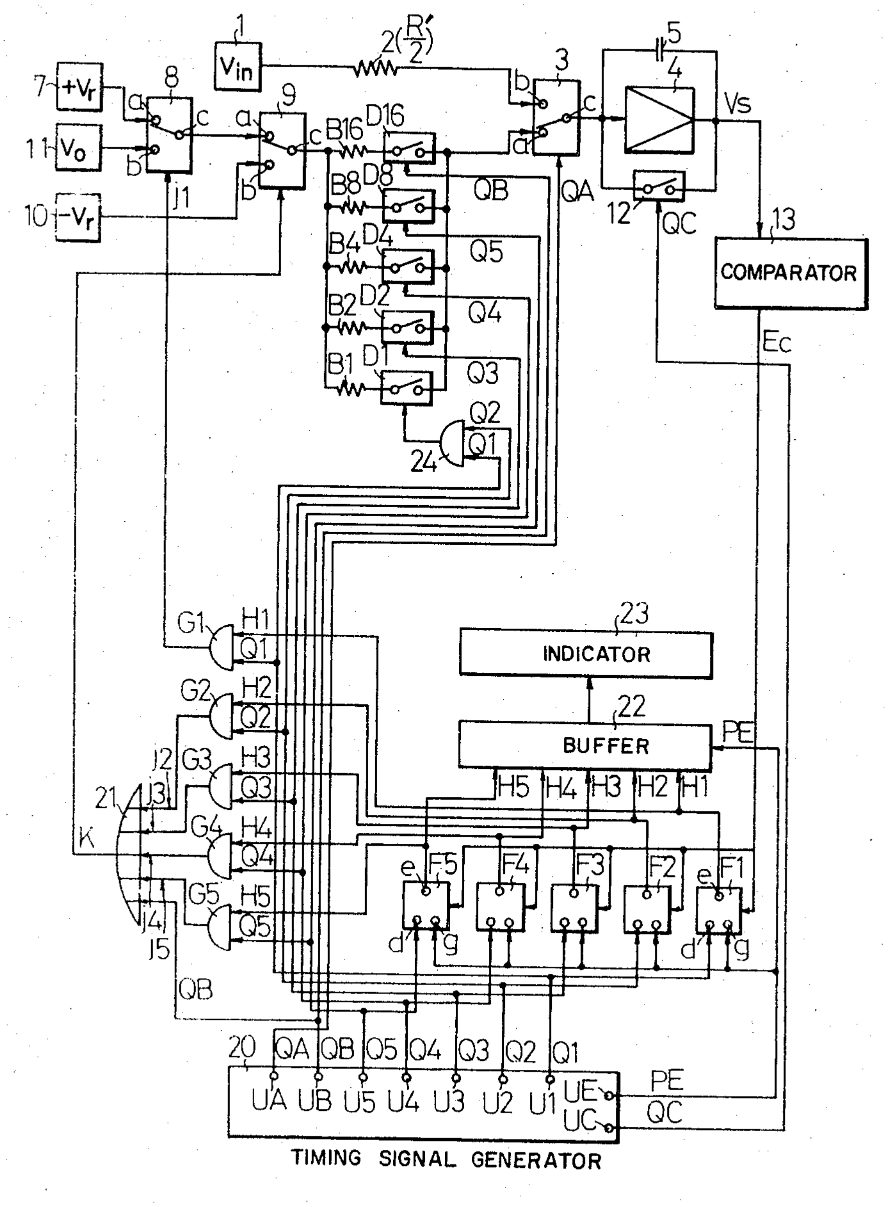
FIG. 4 is a block diagram illustrating a modified form of the integrating A-D conversion system of this invention.
Figure 5:
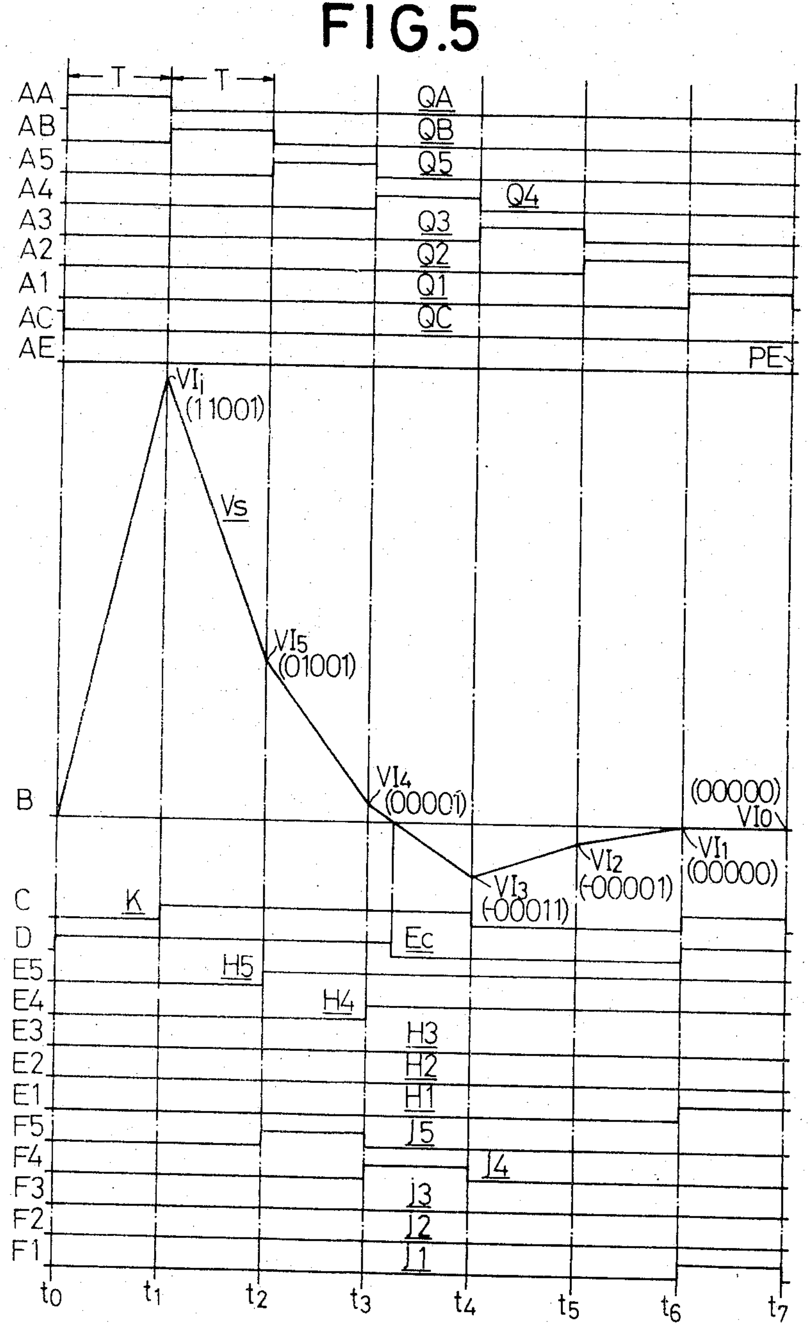
FIGS. 5 and 6 are waveform diagrams for explaining the system shown in FIG. 4.

Referring now to FIG. 4, another embodiment of this invention will hereinafter be described. The present example is identical in construction with that of FIG. 1 except that a parallel circuit consisting of resistors B16, B8, B4, B2 and B1 respectively having resistance values R, 2R, 4R, 8R and 16R is used in place of the resistor B in FIG. 1, that switches D16, D8, D4, D2 and D1 are connected in series with these resistors B16, B8, B4, B2 and B1, that the time intervals between the signals produced by the timing signal generator circuit 20, namely the periods of time between the times $t_0$ and $t_1$, between $t_1$ and $t_2$ . . . and between $t_6$ and $t_7$ are equally T, that the resistance value of the resistor 2 is $R^1/2$, that the switches D16, D8, D4 and D2 are respectively controlled by the rectangular waves QB, Q5, Q4 and Q3 to be closed when the rectangular waves are at the level "1" and that the switch D1 is controlled by the rectangular waves Q2 and Q1 derived from the "OR" circuit 24 to be closed when the rectangular waves are at the level "1." Accordingly, elements corresponding to those in FIG. 1 are identified by the same reference numerals and characters and will not be described further. In the event that the analog voltage $V_{in}$ is "11001" in binary number as above described, the values $VI_i$, $VI_5$, $VI_4$, $VI_3$, $VI_2$, $VI_1$ and $VI_0$ of the integrated outputs $V_s$ at the times $t_1$, $t_2$, $t_3$, $t_4$, $t_5$, $t_6$ and $t_7$ respectively become "11001," "01001," "00001," "−00011," "−00001," "00000" and "00000" volts, based upon the following integration equations, as depicted in FIG. 5.

$$\frac{1}{\frac{R'}{2}C}\int_0^T V_{in}\,dt = VI_i \qquad (21)$$

$$-\frac{1}{RC}\int_0^T V_{in}\,dt = -V_{16} \qquad (22)$$

$$-\frac{1}{2RC}\int_0^T V_r\,dt = -V_8 \qquad (23)$$

$$-\frac{1}{4RC}\int_0^T V_r\,dt = -V_4 \qquad (24)$$

$$\frac{1}{8RC}\int_0^T V_r\,dt = V_2 \qquad (25)$$

$$\frac{1}{16RC}\int_0^T V_r\,dt = V_1 \qquad (26)$$

$$\frac{1}{16RC}\int_0^T V_0\,dt = V_0 \qquad (27)$$

As a result it is known that the analog voltage $V_{in}$ is "11001" as in FIG. 1.

Figure 6:
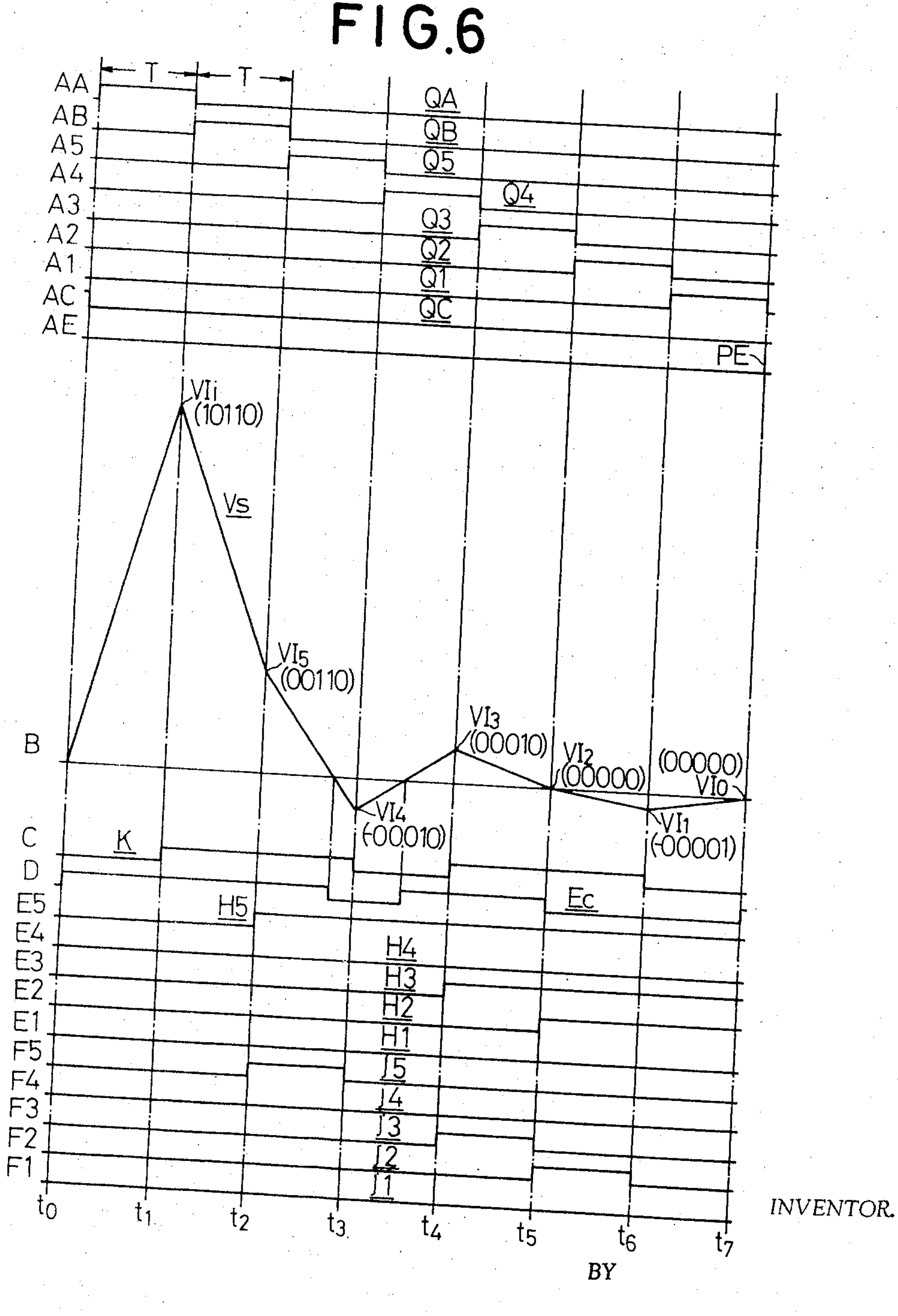

In the event that the analog voltage $V_{in}$ is "10110," the values $VI_i$, $VI_5$, $VI_4$, $VI_3$, $VI_2$, $VI_1$ and $VI_0$ of the integrated outputs $V_s$ at the times $t_1$, $t_2$, $t_3$, $t_4$, $t_5$, $t_6$ and $t_7$ respectively become "10110," "00110," "–00010," "00010," "00000," "–00001"and "00000" volts, based upon the following equations, as shown in FIG. 6.

$$\frac{1}{\frac{R'}{2}C}\int_0^T V_{in}\,dt = VI_i \qquad (28)$$

$$-\frac{1}{RC}\int_0^T V_r\,dt = -V_{16} \qquad (29)$$

$$-\frac{1}{2RC}\int_0^T V_r\,dt = -V_8 \qquad (30)$$

$$\frac{1}{4RC}\int_0^T V_r\,dt = V_4 \qquad (31)$$

$$-\frac{1}{8RC}\int_0^T V_r\,dt = -V_2 \qquad (32)$$

$$-\frac{1}{16RC}\int_0^T V_r\,dt = -V_1 \qquad (33)$$

$$\frac{1}{16RC}\int_0^T V_r\,dt = V_1 \qquad (34)$$

As a result, it is known that the analog voltage $V_i$ is "10110" as in FIG. 1.

Figure 7:
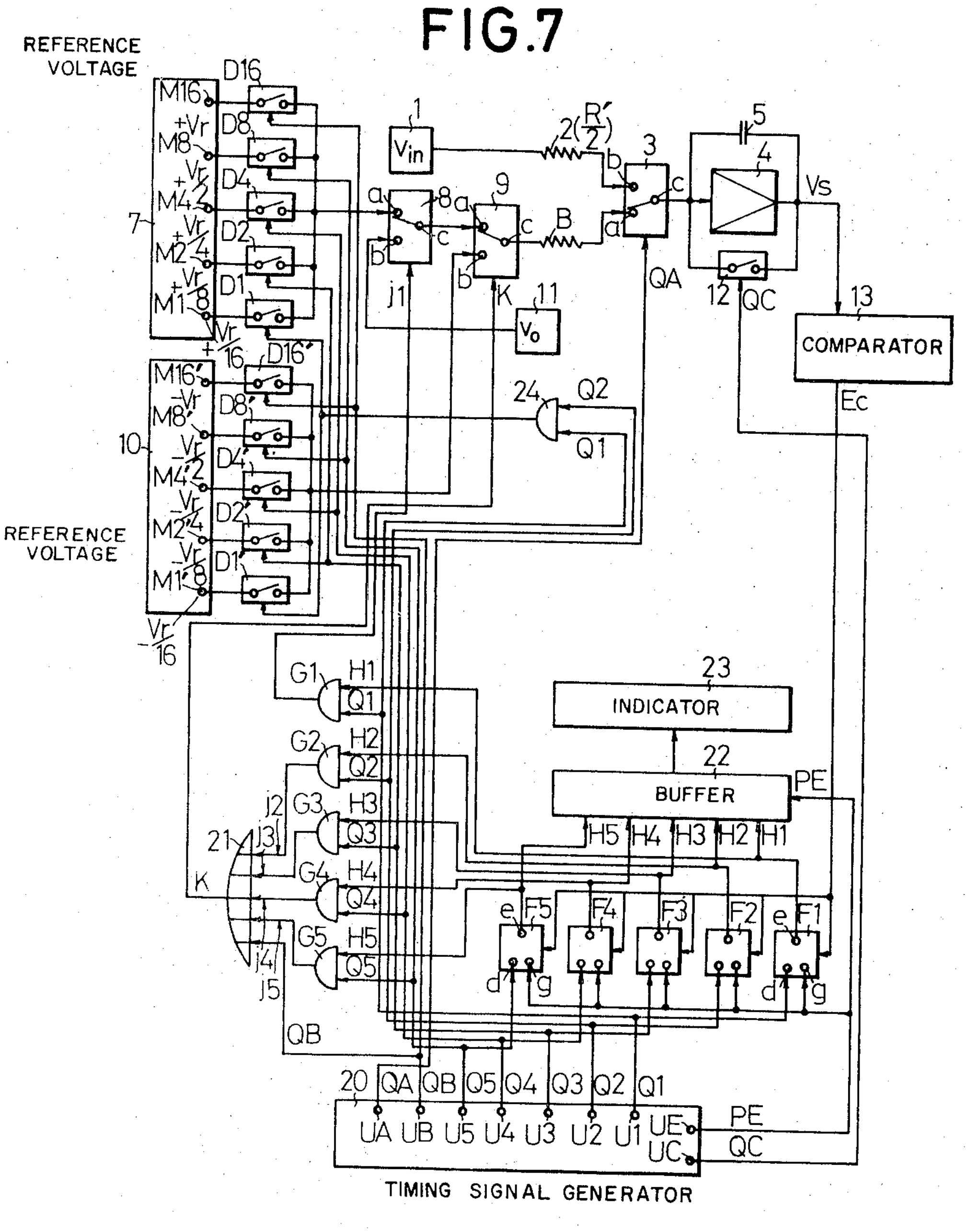
FIG. 7 is a block diagram showing another modification of this invention.

Turning now to FIG. 7, a further modified form of this invention will hereinbelow be described. The present example is similar in construction to that of FIG. 1 except in that terminals $M_8$, $M_4$, $M_2$ and $M_1$ for respectively obtaining voltages ($+V_r/2$), ($+V_r/4$), ($+V_r/8$ and ($+V_r/16$) are provided in the power source 7 in addition to the terminal $M_{16}$ of the voltage $+V_r$ and are connected to the contact *a* of the switching circuit 8 through switches D16, D8, D4, D2 and D1 respectively, that terminals $M'_8$, $M'_4$, $M'_2$ and $M'_1$ for respectively obtaining voltages ($-V_r/2$), ($-V_r/4$), ($-V_r/8$) and ($-V_r/16$) and provided in the power source 10 in addition to the terminal $M'_{16}$ of the voltage $-V_r$ and are connected to the contact *b* of the switching circuit 9 through switches D16′, D8′, D4′, D2′ and D1′, that the switches D16, and D16′, D8 and D8′, D4 and D4′ and D2 and D2′ are respectively controlled by the rectangular waves QB, Q5, Q4 and Q3 to be closed when the rectangular waves are at the level "1," that the switches D1 and D1′ are controlled by the rectangular waves Q2 and Q1 derived from the "OR" circuit 24 to be closed when the rectangular waves are at the level "1," that the resistance value of the resistor 2 is R′/2 and that the time intervals of the signals derived from the timing signal generator circuit 20, namely the periods of time between the times $t_0$ and $t_1$, between $t_1$ and $t_2$, . . . . . and between $t_6$ and $t_7$ are all equally T. Accordingly, elements corresponding to those in FIG. 1 are identified by the same reference numerals and characters and will now be described further. In the case where the analog voltage $V_{in}$ is "11001" in binary number, the values $VI_i$, $VI_5$, $VI_4$, $VI_3$, $VI_2$, $VI_1$ and $VI_0$ of the integrated outputs $V_s$ at the times $t_1$, $t_2$, $t_3$, $t_4$, $t_5$, $t_6$ and $t_7$ respectively become "11001," "01001," "00001," "–00011," "–00001," "00000" and "00000" volts, based upon the following equations, as depicted in FIG) 5.

$$\frac{1}{\frac{R'}{2}C}\int_0^T V_{in}\,dt = VI_i \qquad (35)$$

$$-\frac{1}{RC}\int_0^T V_r\,dt = -V_{16} \qquad (36)$$

$$-\frac{1}{RC}\int_0^T \frac{V_r}{2}\,dt = -V_8 \qquad (37)$$

$$-\frac{1}{RC}\int_0^T \frac{V_r}{4}\,dt = -V_4 \qquad (38)$$

$$\frac{1}{RC}\int_0^T \frac{V_r}{8}\,dt = V_2 \qquad (39)$$

$$\frac{1}{RC}\int_0^T \frac{V_r}{16}\,dt = V_1 \qquad (40)$$

$$\frac{1}{RC}\int_0^T V_0\,dt = V_0 \qquad (41)$$

As a result, it is known that the analog voltage $V_i$ is "11001" as in FIG. 1.

Further, where the analog voltage $V_in$ is "10110" the values $VI_i$, $VI_5$, $VI_4$, $VI_3$, $VI_2$, $VI_1$ and $VI_0$ of the outputs at the times $t_1$, $t_2$, $t_3$, $t_4$, $t_5$, $t_6$ and $t_7$ respectively become "10110," "00110," "–00010,""00010," "00000," "–00001" and "00000," based upon the following equations, as depicted in FIG. 6.

$$\frac{1}{\frac{R'}{2}C}\int_0^T V_{in}\,dt = VI_i \qquad (42)$$

$$-\frac{1}{RC}\int_0^T V_r\,dt = -V_{16} \qquad (43)$$

$$-\frac{1}{RC}\int_0^T \frac{V_r}{2}\,dt = -V_8 \qquad (44)$$

$$\frac{1}{RC}\int_0^T \frac{V_r}{4}\,dt = V_4 \qquad (45)$$

$$-\frac{1}{RC}\int_0^T \frac{V_r}{8}\,dt = -V_2 \qquad (46)$$

$$-\frac{1}{RC}\int_0^T \frac{V_r}{16}\,dt = -V_1 \qquad (47)$$

$$\frac{1}{RC}\int_0^T \frac{V_r}{16}\,dt = V_1 \qquad (48)$$

As a result, it is known that the analog voltage $V_i$ is "10110" as in FIG. 1.

Although the foregoing examples of this invention have been described in connection with the case where the analog voltage is obtained in the form of a binary number of five digits, it will be apparent to those skilled in the art that a digital output of any desired number of digits more than one digit can be obtained.

While the foregoing description has been given in connection with the cases where the resistance values and the voltage are held constant and the ratios of the time intervals of the timing signals are sequentially selected 1:½:¼ . . ., where the time intervals of the timing signals and the voltage are held constant and the ratios of the resistance values are sequentially selected 1:2:4 . . ., and where the time intervals of the timing signals and the resistance values are held constant and the ratios of the reference voltages are respectively selected 1:½:¼ . . ., and the ratios of the amounts of integration are obtained as 16:8:4 . . ., it will be seen that the same results as those in the foregoing can be obtained by selecting at suitable ratios of the voltage and the time interval with only the resistance value being constant, at suitable ratios of the time interval and the resistances with only the voltage being constant, or at suitable ratios of the resistances and the voltage with only the time interval in such a manner that the ratios of the amounts of integration are obtained as 16:8:4 . . .. It is also possible to select the resistance, the time intervals and the voltages at suitable ratios.

Although the foregoing description has been given of the case where the analog voltage $V_{in}$ is integrated between the times $t_0$ and $t_1$ and then the reference voltage is integrated, it will be understood that the same results as those described above can be obtained by simultaneously integrating the analog voltage $V_{in}$ and the reference voltage between the times $t_1$ and $t_2$ to shorten the overall period of time by the period of time between $t_0$ and $t_1$.

It will be apparent that many modifications and variations may be effected without departing from the scope of the novel concepts of this invention.

I claim as my invention:

1. An integrating A-D conversion method for converting an analog input voltage into a digital output in the form of a binary number having n digits consisting of first, second, third . . . (n –1)th and nth digits, which comprises the sequential steps $A_0$, $A_1$, $A_2$, $A_3$, . . . $A_{(n-1)}$, $A_n$ and B;

$A_0$: integrating a positive (or negative) analog input voltage by integrating means for a predetermined period of time;

$A_1$: integrating a negative (or positive) reference voltage by the integrating means for a period of time T and storing a digital signal "1" (or "0") in a first storage means when an output derived from the integrating means at the end of the step $A_1$ is positive (or negative);

$A_2$: integrating the negative (or positive) reference voltage by the integrating means for a period of time $2T/(2^2)$ and storing a digital signal "1" (or "0") in a second storage means when an output derived from the integrating means at the end of the step $A_2$ is positive (or negative);

$A_3$: integrating the negative (or positive) reference voltage by the integrating means for a period of time $2T/(2^3)$ and storing a digital signal "1" (or "0") in a third storage means when an output derived from the integrating means at the end of the step $A_3$ is positive (or negative);

. . . .

. . . .

A –1: integrating the negative (or positive) reference voltage by the integrating means for a period of time $2T/(2)^{n-1}$ and storing a digital signal "1" (or "0") in an (n –1)th storage means when an output derived from the integrating means at the end of the step $A_{n-1}$ is positive (or negative);

$A_n$: integrating the negative (or positive) reference voltage by the integrating means for a period of time $2T/(2)^n$ and storing a digital signal "1" (or "0") in a nth storage means when an output derived from the first integrating means at the end of the step $A_n$ is positive (or negative);

B: applying the digital signals stored in the first, second, third, . . . (n-1)th and nth storage means to an output storage circuit to store them therein; thereby providing a digital output in the form of a binary number having n digits consisting of the first, second, third, (n-1)th, and nth digits in order of significance stored in the storage circuit.

2. A method of converting an analog input voltage into a digital output according to claim 1, in which the change of charge during each step is determined by integrating a fixed magnitude reference voltage of polarity inverse to the charge remaining after the preceding step for a time interval that is one half the time interval of the preceding step.

3. A method of converting an analog input voltage into a digital output according to claim 1, in which the change of charge during each step is determined by integrating for a fixed time a fixed magnitude reference voltage of polarity inverse to the charge remaining after the preceding step through an integrator resistor the resistance of which is doubled for each succeeding step.

* * * * *